No. 696,419. Patented Apr. 1, 1902.
J. S. DOAK & A. G. FARRINGTON.
BOLL WEEVIL OR OTHER INSECT DESTROYER.
(Application filed Sept. 16, 1901.)
(No Model.) 2 Sheets—Sheet 2.
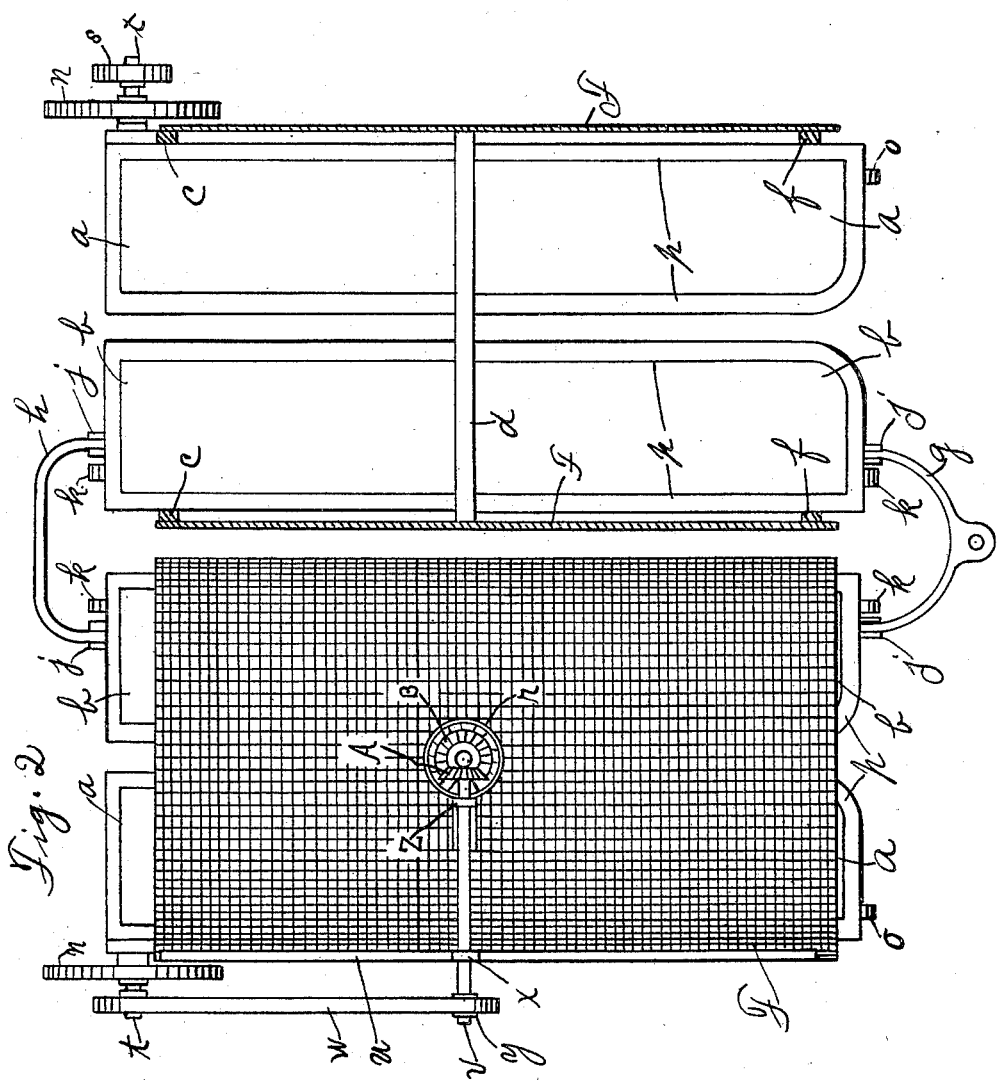

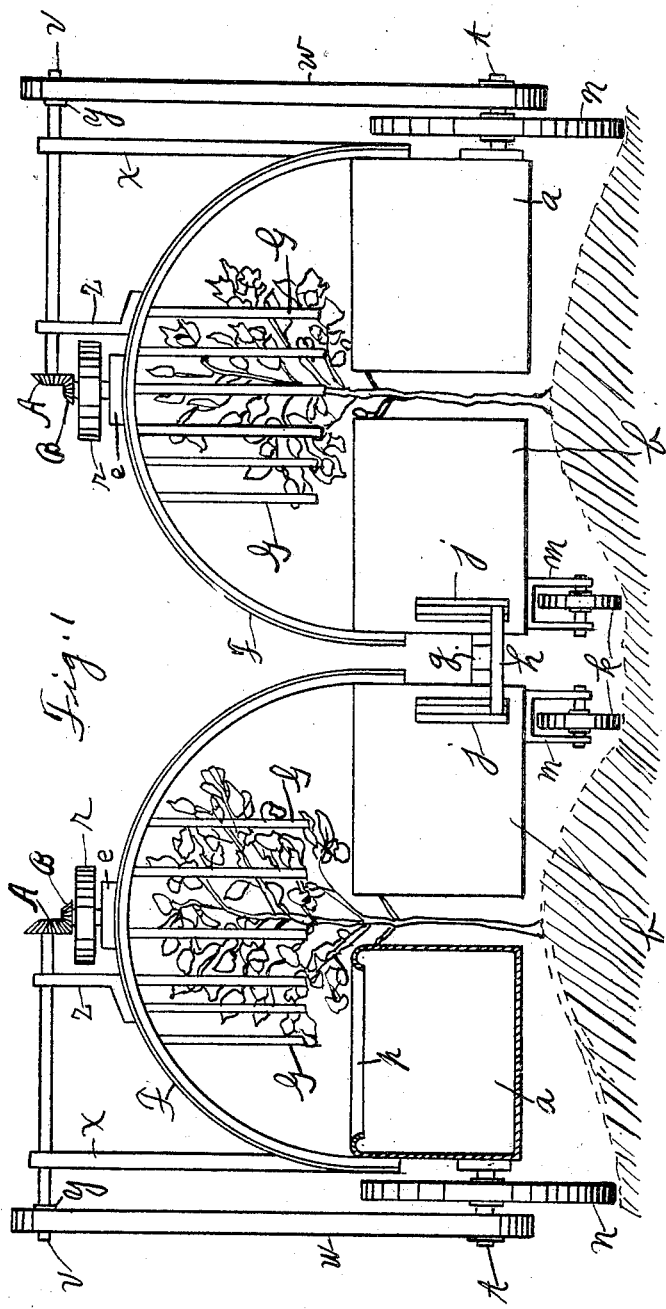

UNITED STATES PATENT OFFICE.

JOHN S. DOAK, OF FORT WORTH, AND ALEXANDER G. FARRINGTON, OF YOAKUM, TEXAS.

BOLL-WEEVIL OR OTHER INSECT DESTROYER.

SPECIFICATION forming part of Letters Patent No. 696,419, dated April 1, 1902.

Application filed September 16, 1901. Serial No. 75,449. (No model.)

*To all whom it may concern:*

Be it known that we, JOHN S. DOAK, of Fort Worth, and ALEXANDER G. FARRINGTON, of Yoakum, Texas, have invented certain new and useful Improvements in Boll-Weevil or other Insect Destroyers, of which the following is a specification.

This invention relates to insect-destroyers, and more particularly to means for destroying boll-weevils, which destroy bolls of cotton on the stalks before the cotton matures. The same means will also destroy grasshoppers, millers which produce army-worms which devour cotton-plants, the army-worms themselves, and other insects.

The object is to construct a destroyer of insects which will be efficient for the purpose set forth and which will be cheap enough for farmers to use.

Other objects and advantages will be fully described, and the invention will be more particularly pointed out in the claims.

Reference is had to the accompanying drawings, which form a part of this application and specification.

Figure 1 is an end elevation of the device used for destroying insects of the character named, one of the troughs being shown in section. Fig. 2 is a top plan view, the screen and two of the bows being removed to illustrate further the arrangement and construction of the troughs.

Our invention consists of a number of troughs in which is placed a liquid or some liquids which kill the insects when thrown in the liquid and of means for throwing insects off of the plants into the liquid. The illustrations show four troughs, or two pairs of troughs, but any practical number of troughs may be used. The troughs $a$ and $b$ constitute a pair of troughs. Each pair of troughs $a$ and $b$ is held in operative relation by the bows $c$, $d$, and $f$, which may be riveted to the outsides of the troughs or bolted to the outsides of the troughs, and the two pairs of troughs are attached together by means of the yokes $g$ and $h$, which are mounted in brackets $j$ pivotally. The brackets $j$ may be riveted or bolted to the ends of the troughs, and these brackets are extended far enough for the yokes $g$ and $h$ to be pivotally mounted therein at different adjustments, so that each pair of troughs may be adjusted to some extent to suit the irregularities of the land over which the destroyer is passing. The troughs $b$ are each provided with two wheels $k$, mounted in hangers $m$, which are placed under the corners of the troughs which are adjacent to each other. The troughs $a$ are each provided with two wheels, one larger wheel $n$ mounted on the side of each trough near the rear end thereof and one small wheel $o$, mounted under the front outside corner of each trough.

The arrangement of wheels above described is preferable; but it is apparent that many other arrangements can be made which will be satisfactory. Each trough is provided with a curved rim $p$, which will prevent the liquid from being jolted out. We have found it practical to use water in the troughs and kerosene-oil. The oil will float on top of the water, and when the insects are thrown in the oil they are killed by the oil. Other liquids, such as lye, will accomplish the same purpose. We do not limit ourselves to any particular liquid.

It is necessary that many of the insects be shaken from the plants, so that they will fall in the liquid.

The invention may be used to destroy insects on other plants than cotton.

We have provided means for shaking the plants as the troughs are passed under the plants. Each pair of troughs is passed under a row of plants. The inner front corners of each pair of troughs are rounded, as shown by Fig. 2, so that the plants will be readily forced between the troughs. A rotary fan $r$ is placed above each pair of troughs. The fans are driven by suitable gearing from the larger rear wheels. Pulleys $s$ are mounted on the shafts $t$ of the wheels $n$, and pulleys $y$ are mounted on shafts $v$, and belts $w$ are mounted on pulleys $s$ and $y$. The shafts $v$ are mounted in bearings $x$ and $z$, which are mounted on the bows $d$. The bearings $x$ may be braced on each side thereof by the braces $u$, the braces $u$ being attached at their lower ends to the bows $c$ and $f$. Beveled cogs A are mounted on the shafts $v$, and beveled pinions B are mounted on the fan-shafts. The fan-shafts have bearings in sockets $e$, mounted on bows *d*, whenever the device is driven by the gearing thus described, the wheels *n* giving motion to the shafts *t* and these shafts driving belts *w*. Belts *w* drive the pulleys *y* and the shafts *v*, which drives the gearing A and B. These operations will rotate the fans, and thus agitate the plants as the troughs are passed under the plants. The boll-weevil becomes sulky when disturbed and will fold up its limbs and can be easily shaken from the plants and will fall into the liquid. We have provided screens F to aid in throwing into the liquid such insects as attempt to fly away. One screen of wire or other netting is provided for each pair of troughs and is placed on the outside of and attached to the bows *c*, *d*, and *f*. As a further means of shaking or agitating the cotton-plants chains or ropes or thongs G are suspended from the bows *d* and *f*. These ropes or chains are flexible and will not injure the cotton, but must have sufficient weight to shake the plants.

The operation will be readily understood without extended description. The liquids are placed in the troughs and the device is moved along the rows of plants, a row of plants being engaged by a pair of troughs and one trough of each pair passing close to each side of the row of plants. The troughs need be very shallow, Having fully described our invention, what we claim as new, and desire to secure by Letters Patent, is—

1. An insect-destroyer for killing insects from growing plants comprising one or more pairs of troughs adapted to contain a liquid poison, means for passing the troughs under the plants, and means for agitating the plants as the troughs are passed thereunder consisting of rotary fans for creating constant blasts, means for mounting and operating said fans, and thongs in combination with said fans for striking the plants.

2. An insect-destroyer for killing insects from growing plants comprising one or more pairs of troughs adapted to contain liquid poison, suitable bows for attaching said troughs in operative positions, said bows being high enough to pass above the plants, a screen for each pair of troughs mounted on said bows and extending down even with the top of the walls of each trough for preventing the escape of insects, wheels provided with suitable spindles attached to said troughs for passing said troughs under the plants, a rotary fan for creating a blast mounted above each screen for agitating the plants, and suitable gearing for driving said fans from said wheels.

3. An insect-destroyer comprising one or more pairs of troughs adapted to contain liquid poison, suitable bows for attaching said troughs in operative positions, said bows being high enough to pass above the plants, a screen for each pair of troughs mounted on said bows and extending down even with the tops of said troughs, wheels provided with suitable spindles attached to said troughs, a rotary fan for creating a blast mounted above each screen and provided with a beveled pinion, a shaft provided with suitable bearings and a beveled cog mounted on said shaft for driving each beveled pinion, a pulley mounted on each shaft, a pulley mounted on one of the spindles of each pair of troughs, and a belt for driving said pulley.

In testimony whereof I set my hand, in the presence of two witnesses, this 21st day of August, 1901.

JOHN S. DOAK.

Witnesses:
 A. L. JACKSON,
 L. T. KNIGHT.

In testimony whereof I set my hand, in the presence of two witnesses, this 24th day of August, 1901.

A. G. FARRINGTON.

Witnesses:
 Z. H. JONES.
 P. S. CLEMENTS.